T. R. Timby.

Hoe.

No. 2,563. Reissued Apr. 16, 1867.

Witnesses:

Geo. A. Morrison

John C. Kenion

Inventor:

Munn & Co.

attys. for

Thos. R. Timby

Per O. Knight

Supt.

THE GRAPHIC CO. PHOTO-LITH. 39 & 41 PARK PLACE, N.Y.

UNITED STATES PATENT OFFICE.

THEODORE R. TIMBY, OF SARATOGA SPRINGS, NEW YORK.

HANDLE FOR IMPLEMENTS.

Specification forming part of Letters Patent No. 62,574, dated March 5, 1867; Reissue No. 2,563, dated April 16, 1867.

DIVISION B.

*To all whom it may concern:*

Be it known that I, THEODORE R. TIMBY, of Saratoga Springs, and the county of Saratoga, in the State of New York, have invented a new and useful Improvement in Handles for Hoes and other Useful Articles; and I do hereby declare the following to be a full, exact, and clear description of the same, sufficient to enable one skilled in the art to which my invention appertains to construct and use the same, reference being had to the accompanying drawings, making part of this specification, in which similar letters indicate corresponding parts.

Figure 1:
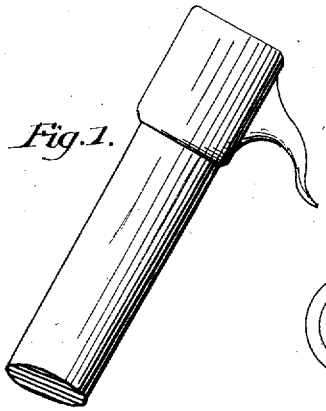
Figure 2:
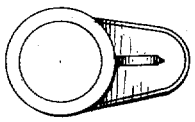
Figure 3:
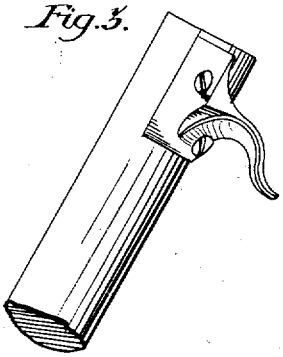

Figure 1 is an elevation of a portion of a handle, with its lipped thimble or ferrule attached. Fig. 2 is an end view of the handle. Fig. 3 is a modified form in which the lip is secured by a plate to the handle, not extending all around the latter, to form a ferrule.

The handle is provided with a hook-shaped abutment or finger-piece, which prevents the hand from slipping on the handle and facilitates the operation of the implement.

B represents a portion of the outer end of the implement-handle, on which is a ferrule, D, or a plate, D′, Fig. 3. The ferrule is slipped over the end of the handle and secured in any suitable manner, or the plate is fastened by screws, as shown.

Upon the ferrule or plate is a projecting hook or abutment, C, by which the hand is prevented from slipping on the handle, and the implement can be operated with the hand half open, whereas with handles of the ordinary construction the operator is compelled to grasp the handle very firmly in order to prevent it from slipping.

With my improvement the handle can be used with the greatest ease without tiring the hand, and it is equally well adapted for garden, field, or plantation hoes, as well as hand-rakes of the various kinds and other implements.

Having described my invention, what I desire to secure by Letters Patent is—

A metallic lipped thimble or ferrule for handles of agricultural implements and other useful articles.

THEODORE R. TIMBY.

Witnesses:
JOHN T. CARR,
L. S. NOYES.